May 17, 1938. A. CLAUD-MANTLE 2,117,339
FASTENING DEVICE FOR AUTOMOBILE HOODS OR THE LIKE
Filed Feb. 24, 1936
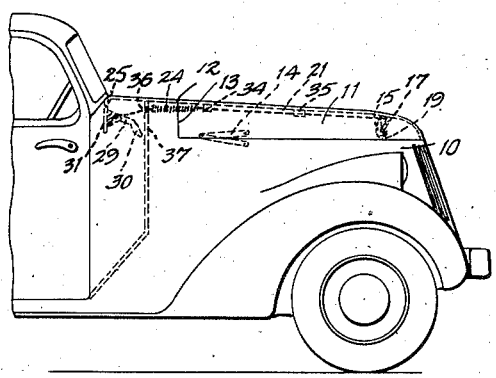
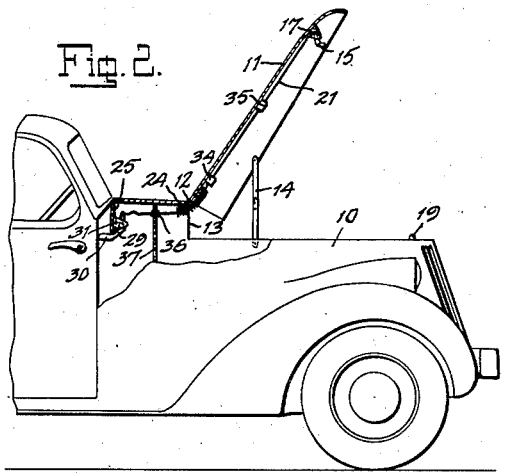
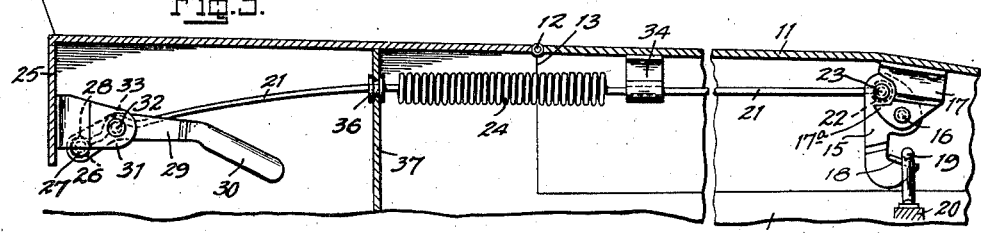
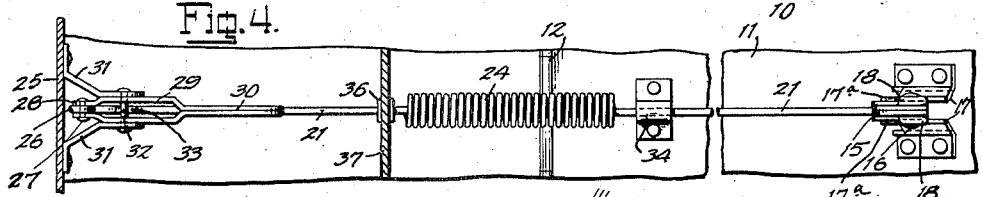
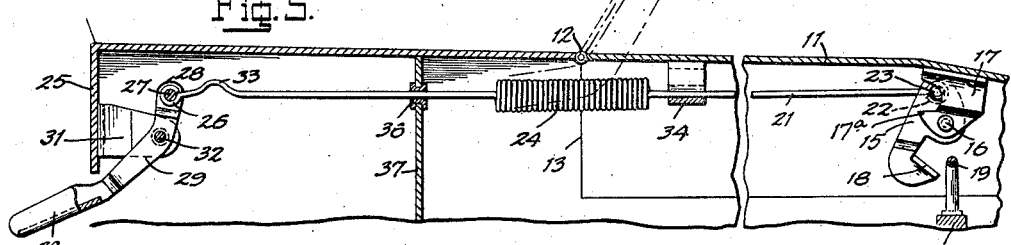
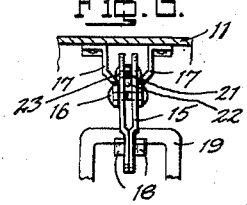
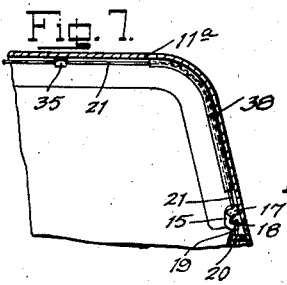
INVENTOR
ARTHUR CLAUD-MANTLE
BY
ATTORNEY Patented May 17, 1938

2,117,339

UNITED STATES PATENT OFFICE 2,117,339

FASTENING DEVICE FOR AUTOMOBILE HOODS OR THE LIKE

Arthur Claud-Mantle, Trumbull, Conn., assignor to The Bassick Company, Bridgeport, Conn., a corporation of Connecticut Application February 24, 1936, Serial No. 65,355

3 Claims. (Cl. 292—123)

The present invention relates to a fastening device especially for automobile hoods, although the invention may be used in connection with other types of closures, as for instance the cover of the rear deck compartment of an automobile. An object is to provide a fastening device which will be entirely enclosed, and which may be operated to fasten and release it from the interior of the automobile, so that when the doors are locked it will be impossible to obtain access to the hood. A further object is to provide a fastening device especially adapted to the type of hood in the form of a cover hinged at its rearward edge along an axis extending cross-wise of the automobile, as distinguished from the common type of hood which is hinged along an axis extending longitudinally of the automobile.

Another object is to provide a fastening device, parts of which extend at each side of the hinge point of the hood, and which is constructed so as not to interfere with the hinged action of the hood. To this end I propose in the illustrated embodiment of the invention to provide a helical spring section integrally formed with the operating rod of the device, and which spring section not only provides spring means for maintaining the catch element engaged under spring pressure but also a flexible means which will flex about the hinge point as the hood is raised or lowered.

With the above and other objects in view, embodiments of the invention are shown in the accompanying drawing, and these embodiments will be hereinafter more fully described with reference thereto, and the invention will be finally pointed out in the claims.

In the drawing:

Fig. 1 is a side elevation of the front portion of an automobile provided with a fastening device according to my invention, the hood being shown in closed locked position.

Fig. 2 is a similar view showing the hood in open position, parts of the structure being shown in section.

Fig. 3 is a longitudinal sectional view showing the hood in closed locking position, parts being broken away.

Fig. 4 is a bottom plan view of the device as shown in Fig. 3.

Fig. 5 is a similar view to Fig. 3 and showing the catch element disengaged, and also showing in dotted lines the position of the spring section of the fastening device in the open position of the hood.

Fig. 6 is an end view of the catch element of the fastening device.

Fig. 7 is a sectional view of the forward end of a modified type of hood, provided with a modified form of my invention.

Similar reference characters indicate corresponding parts throughout the several figures of the drawing.

Referring to the drawing the automobile illustrated is of a type in which the engine compartment 10 is provided with fixed sides with which the fenders, headlight casings, and other such structures may be integrally formed, if desired, the engine compartment being open at its upper side and being normally closed by the hood 11 hinged at 12 to the rearward edge 13 of the engine compartment. In the open position of the hood a brace 14 of any suitable type is adapted to support the hood.

The fastening device comprises a catch lever 15 pivotally mounted at 16 in a bracket 17 secured interiorly of the hood near its forward end, the catch lever being provided with an inclined keeper engaging face 18 adapted to engage the keeper 19, which is preferably in the form of an inverted U-shaped bar rigidly secured to a portion 20 of the engine or frame structure of the automobile. The catch is preferably formed of two pieces of sheet metal welded together at their lower portions, the inclined face portion 18 being formed by outwardly bent flanges upon the respective pieces of sheet metal, and the upper portions being spaced apart so as to receive between them the end of the operating rod 21 which is provided at its end with an eye 22 pivotally engaged upon the pin 23 secured between the two sides of the catch. The position of the pin 23 to the pivot 16 is such that as the rod 21 is pushed the catch is rotated in clockwise direction out of engagement with the keeper while a pull on the rod rotates the catch in counterclockwise direction into engagement with the keeper. Shoulders 17ª—17ª on the bracket 17 limit the counter-clockwise rotation of the catch lever 15 through abutment of the ends of the pin 23 therewith, when the catch lever is disengaged from the keeper.

The rod 21 is provided intermediate its ends with a helically wound spring section 24 which is arranged so that the hinge point 12 of the hood is substantially midway of the ends of the spring section. The rearward end of the rod is connected to the operating lever located upon the inner side of the instrument panel 25, the rod for this purpose being provided at its end with an eye portion 26 pivotally engaged upon a pin 27 secured between the downwardly inclined contracted and spaced end portions 28 of the sides of the operating lever 29, the outer end of this lever being provided with a downwardly inclined handle portion 30. The lever is pivotally mounted in a bracket 31 by means of a pivot pin 32, the bracket being secured upon the inner side of the instrument panel 25. The lever is preferably formed of sheet metal folded upon itself along the handle portion of its length, to form a handle one edge of which is the smooth fold of the metal, the sides of the folded metal extending from the handle portion being spaced apart so as to provide a space within which the rod 21 moves. The arrangement of the pin 27 to the pin 32 is such with relation to the line of force of the rod 21 when the same is tensioned that the pin 27 will be at a point beyond the dead center of the line of force and the lever will therefore be retained in locked relation by a toggle action. The rod 21 is bent at its end portion adjacent the eye 26, as at 33, so that it will extend over the pin 32. The rod 21 extends slidably through brackets 34 and 35 secured upon the under side of the hood and also extends through a cylindrical bearing member 36 secured in the frame portion 37 of the automobile which separates the interior of the same from the engine compartment, the position of this bearing member being such in relation to the centers of the pivot pins 27 and 32 that the line of force of the rod will be below the center of the pivot pin 32 in the locked position and above it in the unlocked position, the inherent flexibility of the rod permitting this arrangement.

The operation is as follows:—

With the parts in the unlocked position as shown in Fig. 5, and with the hood closed, the catch 15 is disengaged from the keeper 19 but is in a position to engage it upon being rotated in counter-clockwise direction, and the operating handle 30 is projected beneath the edge of the instrument panel so that it is in a position to be conveniently operated by the occupant of the car, and also acts as a tell-tale to indicate to the occupant of the car that the hood is unlocked. It will also be observed that in this relation of the device the hood may be opened and the spring section 23 will flex into bent relation about the hinge point 12, as shown in Fig. 2, and by dot-and-dash lines in Fig. 5. To lock the hood it is only necessary to press the handle 30 inwardly whereupon the catch 15 is first rotated in clockwise direction into engagement with the keeper 19, the rod 21 and its spring section 24 acting as a stiff push rod for this purpose. Continued inward movement of the handle causes the spring section 24 to expand tightly wedging the inclined face portion 18 of the catch into engagement with the keeper, and as the pin 27 moves over the dead center the force of the spring snaps the lever into locked position and maintains it in this position through a toggle action. To disengage the catch it is only necessary to pull the handle 30 downwardly for a sufficient distance to bring the pin 27 over the dead center whereupon the parts will be released and may be freely moved as desired.

In Fig. 7 I have illustrated a modified form of hood 11a, which not only extends along the top of the engine compartment, but also extends downwardly at the front. In this modification the rod 21 is of sufficient flexibility to extend through a curved guide tube 38 secured upon the forward end of the hood, and connects with the catch 15 which is located upon the lower end of the forward portion of the hood.

I have illustrated and described preferred and satisfactory embodiments of the invention, but it will be obvious that changes may be made therein within the spirit and scope thereof as defined in the appended claims.

Having thus described my invention what I claim and desire to secure by Letters Patent is:—

1. In a hood structure and fastening means therefor, a fixed keeper, a fixed support, a closure hood hinged at one edge to said support, catch means mounted on the hood and movable into and out of keeper engaging relation, an operating lever mounted on the support at a point at the opposite side of the hinge from said catch means and movable into locking and releasing positions, a flexible connecting member extending between said operating lever and said catch means adapted to flex about said hinge as the hood is opened and closed and including spring means arranged to be tensioned in the keeper engaging position of said catch means through movement of said operating means into locking position, and exerting a force to yieldably retain said operating lever in locking position.

2. In a hood structure and fastening means therefor, a fixed keeper, a fixed support, a closure hood hinged at one edge to said support, catch means mounted on the hood and movable into and out of keeper engaging relation, operating means mounted on the support at a point at the opposite side of the hinge from said catch means, and connecting means extending between said operating means and said catch means including a helical spring section for yieldingly retaining said catch means in keeper engaging relation and disposed adjacent the hinge and adapted to flex about said hinge as the hood is opened and closed.

3. In a hood structure and fastening means therefor, a fixed keeper, a fixed support, a closure hood hinged at one edge to said support, catch means mounted on the hood and movable into and out of keeper engaging relation, operating means mounted on the support at a point at the opposite side of the hinge from said catch means, and a connecting rod member extending between said operating means and said catch means including an integral helical spring section for yieldingly retaining said catch means in keeper engaging relation and disposed adjacent the hinge and adapted to flex about said hinge as the hood is opened and closed.

ARTHUR CLAUD-MANTLE.